Figure 1:
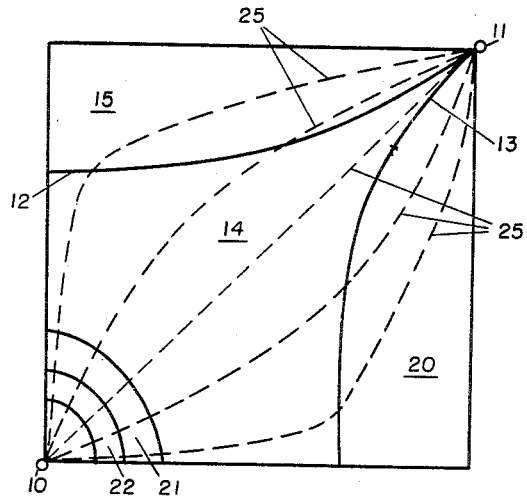

April 20, 1965 L. G. SHARP 3,179,166
METHOD OF RECOVERING OIL FROM A SUBTERRANEAN RESERVOIR
Filed Sept. 27, 1961

LORLD G. SHARP
INVENTOR.

BY H. Mathews Garland
ATTORNEY.

3,179,166
METHOD OF RECOVERING OIL FROM A
SUBTERRANEAN RESERVOIR
Lorld G. Sharp, Irving, Tex., assignor to Socony Mobil Oil
Company, Inc., a corporation of New York
Filed Sept. 27, 1961, Ser. No. 141,122
12 Claims. (Cl. 166—9)

This invention generally relates to the secondary recovery of oil from subterranean reservoirs. More specifically, this invention concerns recovering oil from a subterranean reservoir by a miscible phase displacement technique wherein the sweep efficiency of the process is improved.

When a well is initially completed into a subterranean oil-bearing reservoir, the oil present in the reservoir is normally removed through the well by primary recovery methods which generally comprise the utilization of native reservoir energy, that is, energy which is inherent to the reservoir. This native reservoir energy may be in the form of a water or gas drive which forces the oil from the pores of the reservoir into the well and on to the surface. Primary recovery methods most often, however, leave much of the oil in place within the reservoir because the native reservoir energy becomes depleted long before it has driven the oil present in the reservoir into the well. In view of the large quantities of oil most generally left within reservoirs where they have been produced solely by primary recovery methods, it has become common practice to seek additional oil recovery by the employment of secondary recovery methods of supplementing native reservoir energy by the addition of energy from sources outside of the reservoir. Secondary recovery methods may be instituted prior to the depletion of the native reservoir energy or they may be applied subsequent to the exhaustion of the native reservoir energy.

Miscible flooding processes, or miscible phase displacement techniques as they are often called, are among the various methods of secondary oil recovery employed. Miscible phase displacement techniques generally comprise introducing into the reservoir through an injection well a fluid or fluids which are miscible with the reservoir oil and which serve to displace the oil from the pores of the reservoir and drive it into a production well.

The particular miscible phase displacement techniques with which this application is concerned are the enriched gas method and the miscible slug process.

The enriched gas method normally comprises first injecting into the reservoir a gas which is enriched with hydrocarbons heavier than methane, such as propane and minor amounts of butane and pentane. After such injection, the reservoir oil absorbs the light hydrocarbons ($C_2$, $C_3$, $C_4$, $C_5$) from the injected enriched gas until such time that the reservoir oil becomes miscible with the enriched gas. Also, the enriched gas may comprise sufficient intermediate hydrocarbons to be immediately miscible with the reservoir oil. In either instance, the phase developed at the front of the injected enriched gas drives the reservoir oil through the formation and is in turn driven by a driving fluid which is more lean than the initially injected enriched gas. The pressure necessary to carry out the enriched gas process generally is about 1500 pounds per square inch gauge.

In the miscible slug method, a miscible fluid phase or liquefied slug is developed within the reservoir by injecting a condensable hydrocarbon, such as liquefied petroleum gas, propane, butane, or naphtha, at pressures such that the injected hydrocarbon will be established in liquid phase within the reservoir and thus may be driven through the reservoir to recover the reservoir oil. The pressures necessary to carry out the miscible slug method usually are about 1000 pounds per square inch gauge. A driving gas is injected into the formation behind the condensable hydrocarbon slug in order to drive the slug through the reservoir to the production well.

In carrying out the above-described miscible phase displacement processes, it has been found that serious problems develop with respect to maintaining a uniform flood front as the fluids progress through the formation from the injection well to the production well. The uniformity to which the flood pattern, that is, the pattern assumed by the displacing fluids, may be held is generally referred to as the sweep efficiency of the flood. When the flood departs from a uniform frontal pattern, generally a portion of the flood will break through to the production well in advance of the remainder of the flood, resulting in leaving behind substantial quantities of the reservoir oil. The sweep efficiency of a flood pattern is considered from the standpoint of both the horizontal and the vertical patterns of the flood. The horizontal pattern of a flood, that is, the configuration of the flood pattern in a horizontal plane extending through the formation perpendicular to the injection and production wells, is generally referred to as the areal sweep. The flood pattern along perpendicular planes extending through the formation parallel to the injection and production wells as referred to as the vertical sweep. The efficiencies of these patterns are respectively referred to as the horizontal sweep efficiency and the vertical sweep efficiency.

The horizontal and vertical sweep efficiencies of a flood pattern are affected by several factors including the permeabilities of the various portions of the formation being treated. The permeability of a formation or a portion of a formation is a measure of the ease with which a fluid may flow through the formation. The permeability of a formation to a particular fluid is affected not only by factors such as pore size and configuration but also by the fluids which are inherently present in the formation. The presence of a highly permeable zone within the formation, that is, a zone which is highly permeable relative to other zones within the same formation, reduces the sweep efficiency of a flood pattern moving through the formation because the fluids comprising the flood tend to migrate to and flow more readily through the highly permeable zone than they do through the less permeable zones. This condition results in the displacing of fluids moving more rapidly through the more permeable zone and subsequent breakthrough to the production well in advance of the displacing fluids which are moving through the less permeable zones of the formation, causing the oil in those less permeable zones to be left within the reservoir. Another condition which is known to exist, particularly with respect to the areal sweep of a flood pattern, is the tendency of the center portion of the flood pattern, that is, the portion of the flood pattern in the vicinity of a line drawn directly between the injection and production wells, to advance or accelerate at a rate more rapidly than those portions of the flood pattern which are off-center or more nearly toward the sides of the pattern.

Poor sweep efficiency, both vertical and areal, not only results in reducing the amount of oil which is recoverable but also necessitates the use of unnecessarily large quantities of the miscible fluids being employed in carrying out the particular secondary recovery process.

It has been found that the flood pattern of a miscible fluid may be favorably altered to increase sweep efficiency by presweeping a reservoir with a gas, thus establishing free gas saturation and consequently reducing the oil permeability in the more readily swept areas.

In accordance with the invention, oil is recovered from a subterranean reservoir by a miscible phase displacement method which comprises the steps of (1) introducing into the reservoir through an injection well, as the first step of said displacement method, a first gaseous fluid which is immiscible with the native reservoir fluids and forcing the gaseous fluid through the reservoir toward a production well to establish free gas saturation in the more readily swept portions of the reservoir, (2) introducing into the reservoir through the injection well a second fluid under proper conditions to establish miscibility with the reservoir oil, and (3) injecting into the reservoir through the injection well a third fluid which is a driving fluid to force the previously injected fluids through the reservoir toward the production well and thus driving the recoverable reservoir oil from the reservoir through the production well.

It is one object of the present invention to provide an improved method of secondary recovery of hydrocarbon oil. It is another object of the present invention to provide a miscible fluid displacement process of secondary recovery of hydrocarbon oil wherein the areal and vertical sweep efficiencies of the flood pattern employed are improved. These and further objects of the invention will be apparent from a reading of the following specification taken in conjunction with the accompanying drawings.

In the drawings, FIGURE 1 is a diagrammatic representation of an areal sweep pattern in one quadrant of a typical 5-spot pattern of a miscible phase displacement process carried out in accordance with the invention.

Figure 2:
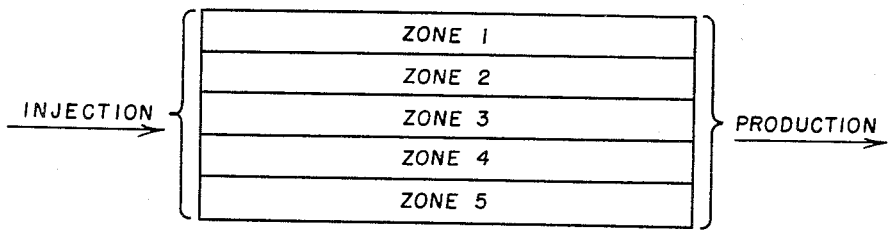

FIGURE 2 is a diagrammatic illustration of a stratified core sample employed in a laboratory test of the method of the invention.

While FIGURE 1 of the drawings shows the application of the method of the invention to a portion of a typical 5-spot pattern of well arrangement, it is to be understood that the invention may be carried out with any well arrangement pattern so long as the particular reservoir being produced is provided with at least one well through which fluids may be injected into the reservoir and one well through which fluids may be produced from the reservoir. As is well known, a typical 5-spot pattern of well arrangement comprises four producing wells positioned at the four corners of a square encompassing the reservoir or a portion thereof with an injection well being located at the geometrical center of the square. In employing a 5-spot pattern, the fluids used for recovery of reservoir oil are injected into the reservoir through the injection well and driven through the reservoir toward each of the production wells through which the reservoir oil and injected fluids are removed from the reservoir.

The fundamental basis on which the present invention is predicated is the proposition that the ready flow of oil through a reservoir may be retarded in those portions of the reservoir through which the oil will normally most easily flow by the establishment of free gas saturation in such portions, thus establishing a condition within the reservoir which will permit oil to flow from the less permeable portions of the reservoir. By establishing free gas saturation, the permeability to oil is lowered.

It is preferred that a reservoir which is to be produced by the miscible phase displacement method of the present invention be previously produced by other means to a pressure no lower than the bubble point for the hydrocarbon system in the reservoir. In other words, it is preferred that a reservoir which is to be produced by the present invention have no free gas saturation. It is well known that production to a pressure below the bubble point results in the establishment of a free gas phase within a reservoir and thus the reservoir becomes saturated with free gas. While it has been stated that the reservoir to which the method of the invention is applied preferably should have no free gas saturation, it has been found that free gas saturation up to a maximum of approximately 5 percent may be tolerated without seriously affecting the operability of the invention in recovering oil.

The first step in carrying out the method of the invention is the establishment of free gas saturation within the more permeable portions of the reservoir by means of a pregas sweep of the reservoir. This step is carried out by injecting a gaseous fluid into the reservoir through an injection well at a pressure sufficient to drive the fluid through the reservoir toward a production well in communication therewith. It has been found that where a gaseous fluid is so injected into a reservoir and driven into a production well, at the time of breakthrough of the gas into the production well approximately 63 percent of the reservoir will have been swept by the gas. It also has been found that where a reservoir or a portion thereof has about 20 percent free gas saturation, the permeability of that portion in which the free gas saturation exists is lowered with respect to oil to a value of from one-half to one-tenth of its original value. While it is preferred that approximately 20 percent free gas saturation be established in the readily swept portions of the reservoir, a value ranging from 10 to 30 percent free gas saturation in these portions will effectively improve the efficiency of a miscible phase displacement process. It is therefore desirable that the quantity of gaseous fluid injected in the first step of the method of the invention comprise from 6 to 18 percent, preferably about 12 percent, of the hydrocarbon pore volume of the reservoir. The term "hydrocarbon pore volume," in the sense used herein, means that portion of the reservoir which was originally occupied by hydrocarbon fluid. The gaseous fluid which is employed in the first step of the invention to establish the desired free gas saturation in the more permeable zones of the reservoir is preferably a gaseous fluid which, at the pressures employed, is immiscible with the original hydrocarbon oil of the reservoir. The gaseous fluid employed in this step preferably is methane, although other gaseous fluids may be used, such as flue gas or air.

Referring to FIGURE 1 of the drawings, the first step of the invention is carried out by introducing the above-described gaseous fluid in an amount ranging from about 6 to about 18 percent, preferably about 12 percent, of the hydrocarbon pore volume of the reservoir into the reservoir through injection well 10 at a pressure sufficiently in excess of the reservoir presure to drive the gaseous fluid through the reservoir toward production well 11. The injected gaseous fluid moves through the reservoir toward the production well until breakthrough eventually occurs into the production well, at which time the portion of the reservoir swept by the injected gaseous fluid will have approached a pattern approximately as outlined by lines 12 and 13 in FIGURE 1. That portion of the reservoir which has been swept by the gaseous fluid is represented as area 14 which lies between lines 12 and 13 and the injection well 10. The areas 15 and 20 of FIGURE 1 are those portions of the reservoir outside of the boundaries of the swept portion and thus represent portions of the reservoir which remain untouched by the gaseous fluid injected in step 1. Prior to the carrying out of step 1, portions 14, 15, and 20 had the same relative permeability to the flow of oil. Subsequent to the establishment of free gas saturation within portion 14, the permeability of portions 15 and 20 to the flow of oil remains the same as previous to initiation of this step while the permeability to the flow of oil of portion 14 is reduced by the free gas saturation to a value ranging from one-tenth to one-half of that existing in portions 15 and 20, depending of course upon the quantity of the gaseous fluid injected in carrying out this step. It is to be understood, of course, that during the injection of the gaseous fluid in step 1, some oil production from the reservoir will be effected through the production well 11.

After the desired amount of immiscible gaseous fluid has been introduced into the reservoir through the injection well, as described above in connection with step 1, the second step of the method of the invention may be initiated. While the driving of the immiscible gaseous fluid of step 1 may be carried to the point of substantial breakthrough, as illustrated in FIGURE 1, before the initiation of step 2, it is not necessary that step 1 be carried to this point before step 2 is begun. At any time after the desired quantity of immiscible gaseous fluid of step 1 has been introduced into the reservoir, step 2 may be started.

Step 2 of the invention comprises the introduction into the reservoir through the injection well 10 of a fluid which is miscible with the reservoir oil, such as either a rich gas or a condensable hydrocarbon. The rich gas may comprise a gas which is enriched with hydrocarbons heavier than methane, such as propane and minor amounts of butane and pentane. The condensable hydrocarbon may be a liquefied petroleum gas, propane, butane, or naphtha, which may be established within the reservoir in liquid phase. If enriched gas is employed, it is, of course, introduced into the reservoir at a pressure sufficient to establish miscibility with the reservoir oil. Absorption of light hydrocarbons, such as $C_2$, $C_3$, $C_4$, and $C_5$, from the injected enriched gas by the reservoir oil enhances the miscibility of the enriched gas with the reservoir oil. If condensable hydrocarbons are employed, they are introduced at a pressure sufficient to establish them in the liquid phase within the reservoir and thus they are immediately miscible with the reservoir oil. As the miscible fluid of step 2 moves from the injection well outwardly into the reservoir, a band of reservoir oil, as represented by area 21 in FIGURE 1, is established along the front boundary of the body of miscible fluid. As the miscible fluid moves further into the reservoir, this band of pure reservoir oil enlarges. Following the band of reservoir oil is a transition zone in which there exists a mixture of the miscible driving fluid and the reservoir oil. Behind the transition zone, as illustrated by area 22 in FIGURE 1, is a band of the injected pure miscible fluid.

Step 3 of the method of the invention comprises introducing into the reservoir through the injection well 10 a lean gas, preferably natural gas comprising largely methane, which is employed for the purpose of driving the miscible fluid of step 2 through the reservoir. The natural gas is introduced in sufficient quantity and at sufficient pressure to effect movement of the miscible fluid of step 2 through the reservoir to produce oil from the reservoir through the production well. The natural gas may be introduced into the reservoir through the injection well until such time as all of the reservoir oil recoverable, together with the miscible fluid of step 2, has been produced from the reservoir through the production well.

When the various injected fluids as described in steps 1, 2, and 3 are established within the reservoir, lines of equal pressure, isobars, and streamlines, lines of equal pressure drop, will result between the injection and production wells. These isobars and streamlines pass not only through the area swept by the gas in step 1, but will also pass through the unswept areas, that is, areas 15 and 20 shown in FIGURE 1. These streamlines are represented by lines 25 in FIGURE 1. It will be understood that lines 25 do not physically exist within a reservoir but rather represent the existence and location of a condition of equal pressure drop. As has been previously stated, the establishment of free gas saturation within area 14 results in a condition whereby the oil in areas 15 and 20 will flow more readily than the oil in area 14 due to the reduction in permeability to oil in area 14. If a miscible phase displacement process were carried out without the establishment of the free gas saturation, the oil bank would move through the reservoir toward the production well with the center of the oil bank advancing rapidly to the point of breakthrough resulting in the bypassing of reservoir oil in areas 15 and 20. In accordance with the present invention, however, as the oil bank moves to and into areas 15 and 20 where the permeability to oil is greater than the permeability to oil in area 14, the oil in areas 15 and 20 is more readily removable and will more rapidly flow to the production well, causing the enlargement of the flow pattern into areas 15 and 20 resulting in more complete removal of the oil than otherwise obtainable by previously practiced miscible phase displacement processes. Thus there results an improvement in the sweep efficiency.

While the above-described improvement in sweep efficiency of the miscible flood was discussed primarily in terms of the free gas saturation within area 14 retarding the rapid advance of the middle portion of the flood pattern, it is to be understood that the same retardation effect will occur under conditions where a reservoir comprises sections of high permeability adjacent to sections of low permeability. These conditions will exist not only from the standpoint of the horizontal, but also along the vertical sections of a reservoir. The pregas sweep which is carried out in step 1 of the method of the invention results in the establishment of free gas saturation within these zones of higher permeability to effect a slowing of the flood pattern through the zones of higher permeability, giving time before breakthrough to the production well of the flood for the oil from the zones of lower permeability to readily flow to the production well.

As indicated above, the method of the invention is applicable to the improvement of vertical as well as areal sweep efficiency. Considering the problem of vertical sweep efficiency, reservoirs are sometimes encountered which are stratified or made up of horizontally extending layers, some of which have a permeability much higher than others. The method of the invention is most effectively applied to such reservoirs by selectively packing off the more permeable strata to restrict the presweep gas to these strata. In other words, it is desirable in dealing with such reservoirs that free gas saturation be established only in the more permeable strata so that oil may flow more readily from the less permeable strata. Packers are set in the injection well and so located that the gas injected in the first step of the invention will be restricted to flowing into the more permeable strata. The packers may be of the retrievable type so that they can be removed after completion of the first step or they may be of a type which may be opened once they have served their purpose in order that the injection well will be full open to allow injection into all zones penetrated by it. Gas is injected during the first step in an amount ranging from 10 to 30 percent of the hydrocarbon pore volume of those zones which are packed off and are to be saturated with free gas. After the first step is completed, the packed-off strata are effectively unpacked by removing or opening the packers as the case may be and then steps 2 and 3 are carried out as previously described.

The process of the invention may be better understood from the following laboratory experiment which was conducted to illustrate the effect of free gas saturation upon permeability. A stratified sand pack, as diagrammatically illustrated in FIGURE 2, was prepared from layers of sand which were packed into a transparent enclosure. The sand was placed in layers illustrated in the drawing as zones 1 through 5 within a transparent box-shaped enclosure having a length of 29 inches. Zones 1, 3, and 5 were determined to have equal specific permeability while zones 2 and 4 were found to have also equal specific permeability which was higher than that of zones 1, 3, and 5. The entire sand pack was saturated with clear Sovasol, which is a kerosine-type hydrocarbon having a boiling point in the range of 300° to 400° F. Gas was injected into zone 1 of the sand pack to establish free gas saturation therein and then the entire pack was flooded with dyed Sovasol. As the flooding of the sand packed with the dyed Sovasol occurred, the advance of the front of the dyed Sovasol in each zone was recorded. With miscible displacement occurring, the percent recovery from each zone was found to be directly proportional to the frontal location of the dyed Sovasol within the sand pack. Since the specific permeabilities of zones 1, 3, and 5 were known to be equal, the frontal advance rate of the dyed Sovasol through each zone would be substantially the same provided each zone was 100 percent oil saturated. It was found, however, that the free gas saturation established within zone 1 lowered the permeability to oil in that zone and the frontal advance through that zone was proportionately slowed. Colored slides were taken at time intervals during the flooding of the sand pack and the distance traveled by the dyed Sovasol in each zone was found to be as shown in the following table:

*Table*

| Slide No. | Distance of Travel of Dyed Sovasol, In— | | |
|---|---|---|---|
| | Zone 1 | Zone 3 | Zone 5 |
| 1 | 2.7 | 3.7 | 3.8 |
| 2 | 5.3 | 6.9 | 6.9 |
| 3 | 5.8 | 12.7 | 11.6 |
| 4 | 6.4 | 16.0 | 13.9 |
| 5 | 8.5 | 20.0 | 19.8 |
| 6 | 8.5 | 21.4 | 21.4 |
| 7 | 11.6 | 26.7 | 27.0 |
| 8 | 13.8 | 29.0 | 29.0 |

It is evident from the above table that the free gas saturation within zone 1 effected a lowering of the permeability within that zone to less than one-half of its specific permeability. Thus, the gas successfully partially blocked the flood frontal advance through zone 1.

What is claimed is:

1. In a miscible phase displacement method of producing oil from a subterranean reservoir which has a free gas saturation of less than approximately 5 percent the steps which comprise injecting into said reservoir through an injection well leading thereto, as the first step of said displacement method, a first fluid which is gaseous and immiscible with said oil in said reservoir to establish free gas saturation within the portions of said reservoir swept by said fluid, introducing into said reservoir through said injection well a second fluid which is miscible with said oil in said reservoir to establish within said reservoir a phase miscible with said oil, and injecting into said reservoir through said injection well a third fluid which is gaseous to force said first and second fluids and said oil through said reservoir to a production well leading therefrom.

2. The method of claim 1 wherein the pressure in said reservoir prior to the injection of said first fluid is at a minimum of the bubble point pressure for the hydrocarbon fluids in said reservoir.

3. The method of claim 1 wherein the quantity of said first fluid comprises substantially 6 to 18 percent of the hydrocarbon pore volume of said reservoir.

4. The method of claim 1 wherein the quantity of said first fluid comprises substantially 12 percent of the hydrocarbon pore volume of said reservoir.

5. In a miscible phase displacement method of producing oil from a subterranean reservoir having in communication therewith at least one injection well and one production well, said reservoir having a free gas saturation no greater than about 5 percent, the steps which comprise injecting into said reservoir through said injection well, as the first step of said displacement method, a gaseous fluid comprising principally methane in an amount ranging from 6 to 18 percent of the hydrocarbon pore volume of said reservoir at pressure sufficient to drive said gaseous fluid into said reservoir toward said production well to establish free gas saturation in the portion of said reservoir swept by said gaseous fluid, injecting into said reservoir through said injection well a hydrocarbon fluid which is miscible with the oil in said reservoir at a pressure sufficient to establish miscibility between said hydrocarbon fluid and said oil, injecting into said reservoir through said injection well a hydrocarbon fluid comprising principally methane at a pressure sufficient to drive said miscible fluid through said reservoir toward said production well, and recovering oil from said reservoir through said production well.

6. In a miscible phase displacement method of producing oil from a reservoir having in communication therewith at least one injection well and one production well, said reservoir having free gas saturation of less than about 5 percent, the steps which comprise introducing into said reservoir through said injection well, as the first step of said displacement method, a first fluid at a pressure and in quantity sufficient to establish free gas saturation in the portions of said reservoir swept by said fluid to the extent that the permeabilities of said portions to oil are reduced to values in the range of one-tenth to one-half the values existing prior to the introduction of said first fluid, said first fluid being gaseous and immiscible with the oil in said reservoir at reservoir pressure and temperature, introducing into said reservoir through said injection well a second fluid, said second fluid being miscible with the oil in said reservoir, at a pressure sufficient to establish a miscible phase in said reservoir which will displace said oil through said reservoir toward said production well, introducing into said reservoir through said injection well a third fluid, said third fluid being a gaseous hydrocarbon fluid, driving said miscible phase and said oil through said reservoir by means of said third fluid, and recovering oil from said reservoir through said production well.

7. The method of claim 6 wherein said first fluid is substantially methane in an amount ranging from about 6 percent to about 18 percent of the hydrocarbon pore volume of said reservoir.

8. The method of claim 6 wherein said first fluid is substantially air in an amount ranging from about 6 percent to about 18 percent of the hydrocarbon pore volume of said reservoir.

9. The method of claim 6 wherein said first fluid is substantially flue gas in an amount ranging from about 6 percent to about 18 percent of the hydrocarbon pore volume of said reservoir.

10. The method of claim 6 wherein said first fluid is substantially methane in an amount ranging from about 6 percent to about 18 percent of the hydrocarbon pore volume of said reservoir, said second fluid is a liquefied, normally gaseous hydrocarbon, and said third fluid is substantially methane.

11. In a miscible phase displacement method of producing oil from a reservoir having in communication therewith at least one injection well and at least one production well, said reservoir comprising a plurality of stratified zones of varying permeabilities and having a free gas saturation no greater than about 5 percent, the steps which comprise selectively packing off within said injection well the stratified zones of higher permeability, injecting through said injection well into said zones of higher permeability, as the first step of said displacement method, a gaseous fluid which is immiscible with the oil in said reservoir to establish free gas saturation within said zones, unpacking said zones of higher permeability to allow free flow from said injection well into all zones of said reservoir penetrated by said well, introducing into said reservoir through said injection well a fluid which is miscible with said oil in said reservoir under conditions of pressure to establish miscibility with said oil, introducing into said reservoir through said injection well another gaseous fluid which is immiscible with said oil to drive said previously injected fluids and said oil through said reservoir to said production well, and producing oil from said reservoir through said production well.

12. In the method of claim 11 wherein the amount of gaseous fluid introduced into said packed-off zones ranges from about 10 percent to about 30 percent of the hydrocarbon pore volume of said packed-off zones.

References Cited by the Examiner
UNITED STATES PATENTS

| | | | |
|---|---|---|---|
| 2,347,769 | 5/44 | Crites | 166—7 X |
| 2,867,277 | 1/59 | Weinaug | 166—9 |
| 2,994,373 | 8/61 | Stone | 166—9 |
| 3,080,917 | 3/63 | Walker | 166—9 |

CHARLES E. O'CONNELL, *Primary Examiner.*

NORMAN YUDKOFF, *Examiner.*